United States Patent [19]
Brenot et al.

[11] Patent Number: 6,017,595
[45] Date of Patent: Jan. 25, 2000

[54] STRUCTURAL BUILDING MATERIALS OR ARTICLES OBTAINED FROM A COMPOSITE INCLUDING POLYMERIC MATERIALS, SOLID WASTE MATERIAL, AND REINFORCING MATERIALS

[76] Inventors: Stephen E. Brenot, R.R. 6, Box 114, Fergus Falls, Minn. 56537; Arnold G. Althoff, 16870 County Rd. 16, Hankinson, N. Dak. 58041; Randy M. Schneider, 20 - 7TH St. South, 190 501, Fargo, N. Dak. 58103

[21] Appl. No.: 08/932,061

[22] Filed: Sep. 15, 1997

[51] Int. Cl.⁷ .................................................. C04B 18/04
[52] U.S. Cl. .................... 428/2; 52/DIG. 9; 428/903.3
[58] Field of Search .................. 428/2, 903.3; 52/DIG. 9

[56] References Cited

U.S. PATENT DOCUMENTS

| | | | |
|---|---|---|---|
| 3,801,358 | 4/1974 | Steinberg et al. | 52/DIG. 9 |
| 3,991,005 | 11/1976 | Wallace | 428/2 X |
| 4,600,610 | 7/1986 | Hrovat et al. | 428/2 |
| 4,997,711 | 3/1991 | Takahashi et al. | 428/2 X |
| 5,196,620 | 3/1993 | Gustin et al. | 428/903.3 X |
| 5,358,760 | 10/1994 | Furlong et al. | 428/2 X |

*Primary Examiner*—Henry F. Epstein
*Attorney, Agent, or Firm*—David A. Lingbeck

[57] ABSTRACT

This invention relates to a mixed composition for making structural building materials or articles; wherein the composition comprises a prepared or reprocessed solid or sludge waste material such as impure lime obtained, in particular, from water treatment plants, and further comprises a reinforcing material such as fiberglass, metal material, sisal fiber, or plastics, and also comprises a polymeric material which preferably includes polyurethane foam. A coloring agent is added the composition to give a distinctive color to the structural building materials or articles such as shingles, panels, sidings, walls, and logs, all replicating products made especially from wood.

12 Claims, No Drawings

6,017,595

STRUCTURAL BUILDING MATERIALS OR ARTICLES OBTAINED FROM A COMPOSITE INCLUDING POLYMERIC MATERIALS, SOLID WASTE MATERIAL, AND REINFORCING MATERIALS

BACKGROUND OF THE INVENTION

The present invention relates to structural building materials or articles obtained from a composite including polymeric materials, solid waste material, and reinforcing materials.

Structural building materials or articles made from wood, brick, block, or plastics are well known in the art. Also, polymeric materials are known for making structural materials. However, as will be described, none of the prior art include a composition comprising a solid waste material or sludge waste for making structural building materials.

One known prior art is an INSULATION BOARD, U.S. Pat. No. 4,121,958, comprising a composition including polyol, triphosphate, alkylsilanepolyoxyalkylene copolymer, amine catalyst, dibutyl tin dilaurate, freon, and methylenebis.

Another known prior art are INTUMESCABLE FIRE-RETARDANT PRODUCTS, U.S. Pat. No. 4,234,639, comprising granules made from hydrated soluble silicate glass, a halogenic organic compound, and an iron-containing compound.

Another known prior art are SOLVENT RESISTANT POLYETHERPOLYURETHANE PRODUCTS, U.S. Pat. No. 5,001,167, comprising a thermoset polyurethane polymer prepared from a reaction mixture comprising a polyisocyanate component and an active hydrogen component.

Another known prior art are FOAMED PLASTICS MATERIALS, U.S. Pat. No. 4,595,710, which comprises a phenolic resin material.

Another known prior art is a HYDROPHOBIC COLLOIDAL OXIDE TREATED CORE MATERIAL, METHOD OF PRODUCTION AND COMPOSITION COMPRISED THEREOF, U.S. Pat. No. 4,474,852, comprising a core material such as polyurethane, and further comprising a hydrophobic colloidal oxide selected from a group consisting of silicon, titanium, aluminum, zirconium, vanadium, chromium, iron, or mixtures thereof.

Another known prior art is a HIGHLY FILLED SUBSTANTIALLY SOLID POLYURETHANE, UREA, AND ISOCYANNURATE COMPOSITES FOR INDOOR AND OUTDOOR APPLICATIONS, FOR LOAD BEARING STRUCTURAL AND DECORATIVE PRODUCTS, U.S. Pat. No. 5,053,274.

Another known prior art is a PROCESS FOR THE PRODUCTION OF POLYISOCYANATE SILICATE PLASTICS UTILIZING AN ALKALI METAL CELLULOSE SILICATE CONDENSATION PRODUCT.

Another known prior art is a PROCESS FOR THE PRODUCTION OF MOLDED DECORATIVE ARTICLES FROM A HARDENABLE SUBSTANCE BASED ON THERMOSETTING SYNTHETIC RESIN, U.S. Pat. No. 4,443,392, which comprises a plastic material, calcium or zinc stearate or stearic acid, water, and filler material.

None of the prior art above-described comprises a composition which includes solid sludge waste material to make structural building materials or articles thus helping to preserve the environment and finding a use for what is turning out to be a major problem with what to do with the millions and millions of tons of sludge waste material being piled and left.

SUMMARY OF THE INVENTION

This invention relates to structural building materials or articles obtained from a composite including polymeric materials, solid waste materials or sludge waste material as a by-product or residue received from the making of another thing or product, and reinforcing materials including coloring agents. The composite comprises polymeric material preferably polyurethane foam but possibly polyesters, polyols, polystyrenes, and polyureas and further comprises a solid waste material or sludge waste material commonly found as a by-product of the softening process in water treatment plants, for example, and as a result of making another thing or product; wherein the sludge waste material commonly comprises calcium carbonate, organic materials such as sugar, proteins, and pectins, magnesium carbonate, calcium sulfate, silicon dioxide, indistinct insolubles, toxic chemicals, iron and aluminum oxide, and other impurities; the composite also comprising reinforcing material such as fiberglass, plastic, metal woven cloth, sisal fiber, or woven sisal mat or cloth. The reinforcing material is mixed with the reprocessed sludge waste material to form the composition with the balance of the composition being polymeric material.

One objective of the present invention is to provide structural building materials or articles obtained from a composite of polymeric materials, solid or sludge waste material, and reinforcing materials which are exceptionally lightweight as compared to the prior art.

Another objective of the present invention is to provide structural building materials or articles obtained from a composite of polymeric materials, solid or sludge waste material commonly found as a by-product in water treatment plants, and reinforcing materials which are exceptionally strong and durable as compared to the prior art.

Also, another objective of the present invention is to provide structural building materials or articles obtained from a composite of polymeric materials, solid or sludge waste material, and reinforcing materials which provide added strength to the frame of the building structures.

Further, another objective of the present invention is to provide structural building materials or articles obtained from a composite of polymeric materials, solid or sludge waste material, and reinforcing materials which puts to valuable use of solid or sludge waste materials which are currently being piled in landfills.

Yet, another objective of the present invention is to provide structural building materials or articles obtained from a composite of polymeric materials, lime, and reinforcing materials which can be easily molded to any desired dimensions as selected by the user.

Further objectives and advantages of the present invention will become apparent as the description proceeds.

DETAILED DESCRIPTION OF THE INVENTION

The present invention relates to structural building materials or articles obtained from a composite including (A) polymeric materials, (B) prepared, reprocessed or homogenized solid or sludge waste material which includes impure lime sludge and (C) reinforcing materials. The structural building materials or articles made from this composite include profiled synthetic ceramic shingles, profiled synthetic wood shake shingles, sidings or panels, walls replicating brick, rock, or block, boards, sheet, and panel replicating wood products, and synthetic logs. The composite preferably comprises (A) polymeric material such as polyurethane foam but, alternatively, could include polyesters, polyureas, polystyrenes, and polyols. The composite also includes (B) a filler material comprising a residue resulting from the making or processing of other things, the residue including a lime sludge or impure lime which includes certain indistinct insolubles, iron & aluminum oxides, calcium and magnesium carbonates, and calcium sulfate, the residue also including organic materials such as sugars, proteins, or pectins; and the composite further includes (C) reinforcing materials such as fiberglass, plastics, metal woven cloth, sisal fiber, and woven sisal mat or cloth.

The composition is essentially mixed or blended and heated to form a liquified material which is sprayed or injected with a device into molds or dies to effect the structural building materials or articles. The molds or dies containing the liquified composite material is heated to temperatures effecting the expansion of the mixed composition which is then cured to obtain the structural building materials or articles.

The (A) polymeric material comprises preferably in the range of 40% to 75% by weight or by volume of the composition and is preferably polyurethane foam. Other polymeric material which may be used includes polyesters, polyureas, polystyrenes, polyisocyanates, and polyols. Polyurethane foam is known for use as thermal insulation, soundproofing, and padding and is now being used in a composition to make structural building materials or articles. With the polymeric material, the composition further includes (B) a filler material which is essentially a prepared (such as by conventional washing), reprocessed or homogenized solid or sludge waste material comprising many, many different kinds of impurities which have been, up to now, considered unusable waste material and disposed of as such, the solid or sludge waste material being left over as residue after the making or processing of another thing or product and which includes trichloroethylenes, impure lime or lime sludge including certain indistinct insolubles, iron & aluminum oxides, calcium & magnesium carbonate, and calcium sulfate which comprises in a range of 20% to 40% by weight or by volume of the composition. The dehydrated or impure lime is essentially obtained from processing sugarbeets and even from the treatment of water at water treatment plants and is comprised of less than 95% calcium carbonate and of more than 5% impurities or other chemical elements which includes more than 0.5% insolubles, more than 1% organic material such as sugars, proteins, or pectins, more than 1% magnesium carbonate, less than 1% calcium sulfate, more than 1% silicon dioxide, more than trace amounts of toxic chemicals, and more than 1% iron and aluminum oxide. The reprocessed solid or sludge waste material in the composition essentially strengthens the structural building materials or articles and acts as a shield for the building materials and further provides screw retention in the building materials and is also fire resistant and acts as a fire barrier for the structural building materials or articles.

With regards to component (C), the reinforcing material also adds strength to the structural building materials or articles and may comprise fiberglass, plastic, metal woven cloth, sisal fiber, and woven sisal mat or cloth which comprises in the range of 5% to 20% by weight or by volume of the composition. Components (A) and (B) are mixed or blended together and then injected or sprayed into molds or dies containing the reinforcing material and heated to form the structural building materials or articles. In addition to the components (A), (B), and (C), (D) a coloring agent or conventional die may be added to give the structural building materials or articles a distinctive color and Ultraviolet protection as desired by the user and may comprise from 1% to 5% by weight or by volume of the composition. The coloring agent is added and mixed with the components (A), (B), and (C) of the composition and sprayed or injected into the molds or dies.

The selection of the appropriate operating conditions may be readily determined by those skilled in the art. Generally, processing temperatures may range from 100 Degrees Fahrenheit to 180 Degrees Fahrenheit for liquefying the composition for injecting or spraying the composition into molds or dies to obtain the desired building materials or articles which have excellent surface appearances and physical properties including being durable, lightweight and exceptionally strong and which have properties which can be easily recycled using present technology.

This invention is a welcomed contribution to ecological preservation, wood preservation, environmental protection, and a welcomed contribution to the using of a readily available renewable resource, namely solid waste lime materials obtained from the making and processing of other things.

The present invention is further illustrated by the following examples:

EXAMPLE 1

This composition is used for the production of specific textured and profiled ceramic shingle replicas formed on rigid panels, and the preferred embodiment of the composition for the shingles is illustrated in the following table:

| Components, | % by volume |
|---|---|
| Polyurethane | 55 |
| Prepared Solid or Sludge Waste Material | 20 |
| Fiberglass | 7 |
| Aggregate | 10 |
| Elastameric Adhesive | 5 |
| Color agent | 3 |

EXAMPLE 2

This composition is also used for the production of specific textured and profiled wood shake shingle replicas formed on rigid panels, and the preferred embodiment of the composition for the shingles is illustrated in the following table:

| Components, | % by volume |
|---|---|
| Polyurethane | 65 |
| Solid or Sludge Waste Material (lime) | 20 |
| Fiberglass | 7 |
| Elastameric Adhesive Coating | 5 |
| Color agent | 3 |

EXAMPLE 3

This composition is also used for the production of sidings replicating and replacing wood sidings, and the preferred embodiment of the composition for the sidings is illustrated in the following table:

| Components, | % by volume |
| --- | --- |
| Polyurethane | 60 |
| Solid or Sludge Waste Material (lime) | 25 |
| Fiberglass | 10 |
| Color agent | 5 |

EXAMPLE 4

This composition is also used for the production of walls replicating brick, rock, and even block, and the preferred embodiment of the composition for the walls is illustrated in the following table:

| Components, | % by volume |
| --- | --- |
| Polyurethane | 50 |
| Solid or Sludge Waste Material (lime) | 22 |
| Fiberglass | 5 |
| Aggregate material | 12 |
| Elastomeric Adhesive | 6 |
| Color agent | 5 |

EXAMPLE 5

This composition is also used for the production of plywood-like and cut wood-like boards, sheets, and panels having wood-like grain texture, and the preferred embodiment of the composition for these products is illustrated in the following table:

| Components, | % by volume |
| --- | --- |
| Polyurethane | 55 |
| Solid or Sludge Waste Material | 25 |
| Fiberglass | 15 |
| Color agent | 5 |

EXAMPLE 6

This composition is used for the production of synthetic look-a-like wood logs, and the preferred embodiment of the composition for the logs is illustrated in the following table:

| Components, | % by volume |
| --- | --- |
| Polyurethane | 55 |
| Solid or Sludge Waste Material (lime) | 20 |
| Fiberglass | 20 |
| Color agent | 5 |

The foregoing disclosure and examples of the invention are intended merely to be illustrative and explanatory thereof. Various changes may obviously be made without departing from the scope of the invention which is defined in the following claims.

What is claimed is:

1. A mixed composition for use in forming structural articles comprising: (A) a waste material in the range of 20% to 40% by weight or by volume and being selected from the group consisting of solid waste material and sludge waste material; (B) a reinforcing material in the range of 5% to 20% by weight or by volume; and (C) a polymeric material in the range of 40% to 75% by weight or volume of said composition.

2. A mixed composition for use in forming structural articles as described in claim 1, wherein said waste material includes residues remaining after a process or making of another product.

3. A mixed composition for use in forming structural articles as described in claim 1, wherein said waste material is prepared such as by conventional washing or reprocessed prior to use in said mixed composition.

4. A mixed composition for use in forming structural articles as described in claim 1, wherein said waste material is homogenized prior to use in said mixed composition.

5. A mixed composition for use in forming structural articles as described in claim 4, wherein said waste material includes residues remaining from treatment of water in water treatment plants.

6. A mixed composition for use in forming structural articles as described in claim 5, wherein said waste material comprises less than 95% calcium carbonate and greater than 5% impurities by weight or volume.

7. A mixed composition for use in forming structural articles as described in claim 6, wherein said waste material comprises less than 90% calcium carbonate and more than 10% of which is selected from a group consisting of organic material, magnesium carbonate, iron & aluminum oxide, insolubles, silicon dioxide, toxic chemicals and calcium sulfate.

8. A mixed composition for use in forming structural articles as described in claim 6, wherein said waste comprises less than 80% calcium carbonate and more than 20% being selected from a group consisting of organic material, magnesium carbonate, iron & aluminum oxide, insolubles, calcium sulfate, toxic chemicals and silicon dioxide.

9. A mixed composition for use in forming structural articles as described in claim 8, wherein said organic material includes sugar.

10. A mixed composition for use in forming structural articles as described in claim 8, wherein said organic material includes proteins.

11. A mixed composition for use in forming structural articles as described in claim 8, wherein said organic material includes pectins.

12. A mixed composition for use in forming structural articles as described in claim 4, wherein said waste material includes a lime sludge.

* * * * *